United States Patent
Hashima

(10) Patent No.: US 8,514,223 B2
(45) Date of Patent: Aug. 20, 2013

(54) APPARATUS AND METHOD FOR GENERATING THREE-DIMENSIONAL MODEL DATA

(75) Inventor: Masayoshi Hashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 946 days.

(21) Appl. No.: 12/505,516

(22) Filed: Jul. 19, 2009

(65) Prior Publication Data

US 2010/0020076 A1    Jan. 28, 2010

(30) Foreign Application Priority Data

Jul. 22, 2008  (JP) ................................ 2008-188656

(51) Int. Cl.
  *G06T 17/00*  (2006.01)
  *G06T 17/20*  (2006.01)
  *G06T 15/30*  (2011.01)

(52) U.S. Cl.
  USPC .......................................... 345/420; 345/423

(58) Field of Classification Search
  USPC ................................. 345/420, 423
  See application file for complete search history.

(56) References Cited

U.S. PATENT DOCUMENTS

2008/0165188 A1 *  7/2008  Uraki ............................ 345/420

FOREIGN PATENT DOCUMENTS

JP    2-59867 A    2/1990
JP    10-111885 A  4/1998

* cited by examiner

*Primary Examiner* — Xiao M. Wu
*Assistant Examiner* — Scott E Sonners
(74) *Attorney, Agent, or Firm* — Fujitsu Patent Center

(57) ABSTRACT

A three-dimensional model data generation apparatus generates and stores a three-dimensional model expressing a three-dimensional object that includes a first element having a first surface region and a second element having a second surface region. The apparatus includes a generation unit generating surface shape data on the first and second elements; a detection unit detecting a contact region on which the first surface region and the second surface region are in contact with each other; a storage unit storing, in a storage device, the surface shape data generated by the generation unit; and a discard unit discarding the surface shape data on the contact region in the second surface region.

16 Claims, 14 Drawing Sheets

SURFACE DATA ON COMPONENT 110:
CONTACT REGION IS ERASED

SURFACE DATA ON COMPONENT 110:
HOLE IS FILLED

FIG. 5B
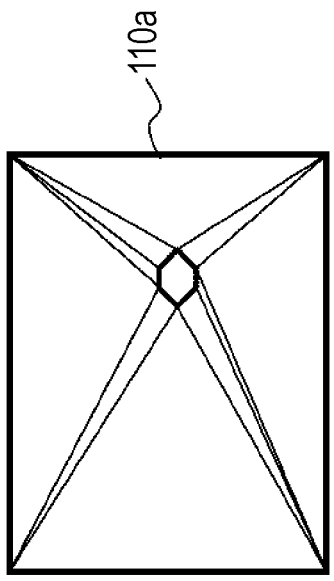
SURFACE DATA ON COMPONENT 110
110a
130d
BACK SURFACE OF COMPONENT 130
FIG. 5A
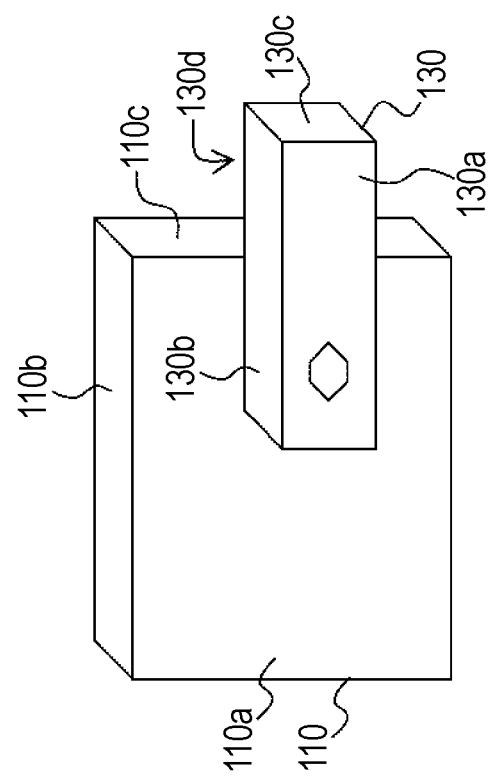

SURFACE DATA ON COMPONENT 110:
OVERLAP PORTION IS ERASED

SURFACE DATA ON COMPONENT 110:
HOLE IS FILLED

BACK SURFACE DATA ON COMPONENT 130:
OVERLAP PORTION IS ERASED

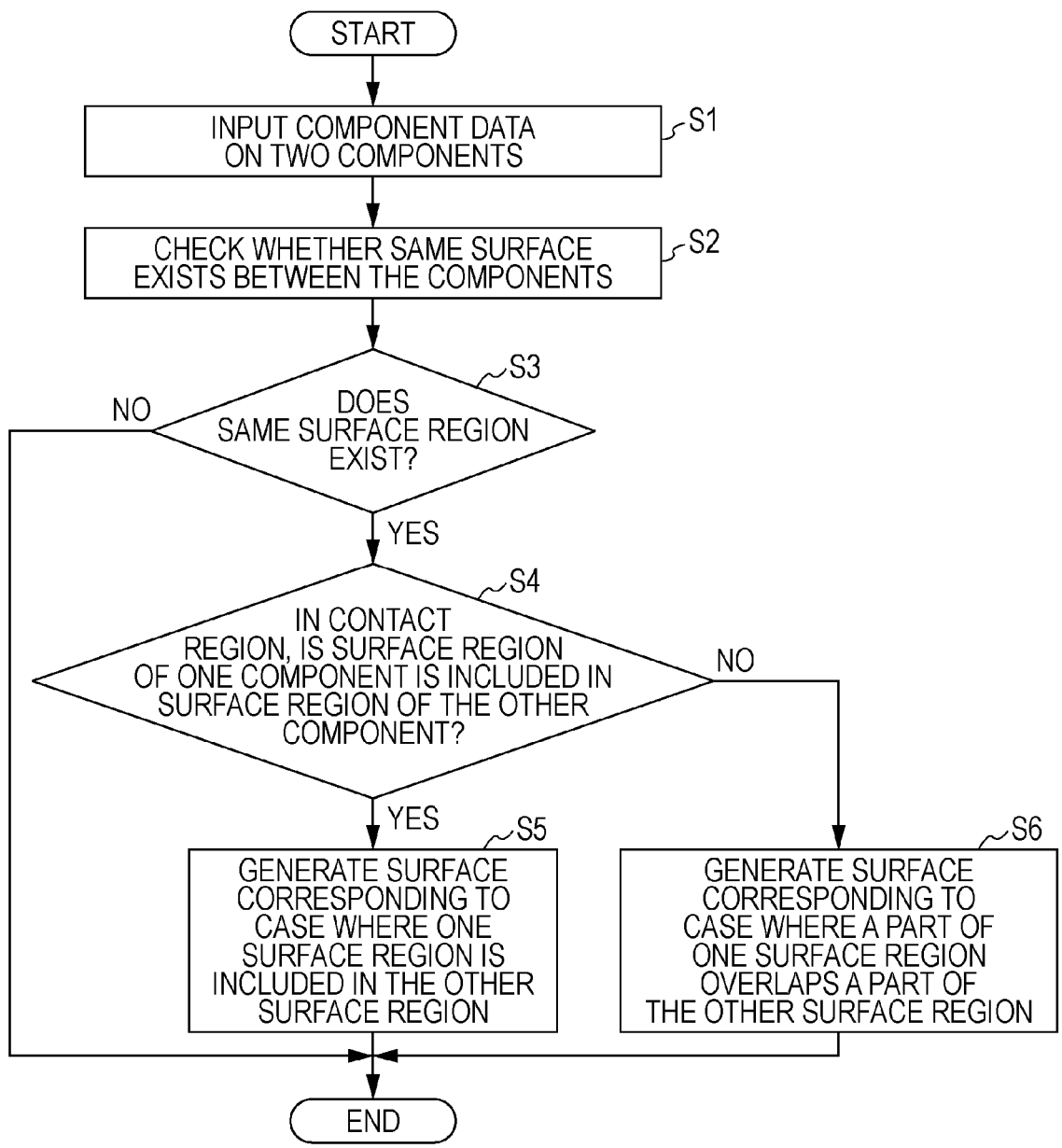

APPARATUS AND METHOD FOR GENERATING THREE-DIMENSIONAL MODEL DATA

CROSS-REFERENCE TO RELATED APPLICATIONS

This application is based upon and claims the benefit of priority of the prior Japanese Patent Application No. 2008-188656, filed on Jul. 22, 2008, the entire contents of which are incorporated herein by reference.

BACKGROUND

The present invention relates to an apparatus and a method for generating surface shape data on a three-dimensional object.

Recently, in the design of three-dimensional objects, computers have been extensively adopted. For example, in the design of mechanical products, three-dimensional shapes of components have been designed using the three-dimensional CAD system. Furthermore, as methods for representing a three-dimensional shapes, for example, a DMU (digital mock-up) and a three-dimensional viewer each of which, upon having built a three-dimensional model on a computer, renders the three-dimensional model as a two-dimensional image, have been put into widespread practice.

In three-dimensional computer graphics, as a technique for expressing the shape of an object, the polygon model has become widely available. The polygon model is an approach to modeling the surface of an object directly or approximately by utilizing a large number of polygons. Here, the polygon is an element for expressing a three-dimensional shape, and generally a triangle or a quadrangle. That is, when treating a three-dimensional graphic by a computer, the surface of an object is divided into minute polygons, and each of the polygons is represented by numerical data. This allows expressing the shape of the object as viewed from an optional view point. Furthermore, by increasing the number of polygons, the shape of the object can be more finely expressed.

As a related art, Japanese Unexamined Patent Application Publication No. 2-59867 discloses a method for erasing an unnecessary seam of joined portions when two convex polyhedrons are joined.

As another related art, Japanese Unexamined Patent Application Publication No. 10-111885 sets forth a management method for CAD drawings. According to this management method, in an external device, there is provided a common data storage region where common data included in N sheets of CAD drawings are stored, and a graphic data storage region where data, other than the common data, included in each of the CD graphics is stored for each of the drawings. When various graphics data is read, the common data is also read from the common data storing region.

SUMMARY

According to an aspect of the embodiments, there is provided a three-dimensional model data generation apparatus for generating and storing a three-dimensional model expressing a three-dimensional object that includes a first element having a first surface region and a second element having a second surface region. The three-dimensional model data generation apparatus includes a generation unit generating surface shape data on the first and second elements; a detection unit detecting a contact region on which the first surface region and the second surface region are in contact with each other; a storage unit storing, in a storage device, the surface shape data generated by the generation unit; and a discard unit discarding the surface shape data on the contact region in the second surface region.

It is to be understood that both the foregoing general description and the following detailed description are exemplary and explanatory only and are not restrictive of the invention, as claimed.

BRIEF DESCRIPTION OF THE DRAWINGS

FIGS. 5A and 5B are diagrams illustrating an example of another three-dimensional model;

FIG. 7 is a schematic flowchart of a three-dimensional model data generation method according to the embodiment;

DESCRIPTION OF THE EMBODIMENTS

In a polygon model, when the shape of a large-scale apparatus or a complicated shape is to be expressed, the number of polygons inevitably becomes larger. That is, data amount of polygon data becomes enormous, which necessitates a high-capacity memory. This problem is not limited to the polygon model, but extensively occurs in techniques for expressing three-dimensional objects.

Therefore, there is a desire for a technique for reducing the data amount of a three-dimensional model expressing a three-dimensional object.

Hereinafter, an embodiment for addressing the above-described problem will be described with reference to the appended drawings.

Figure 1A:
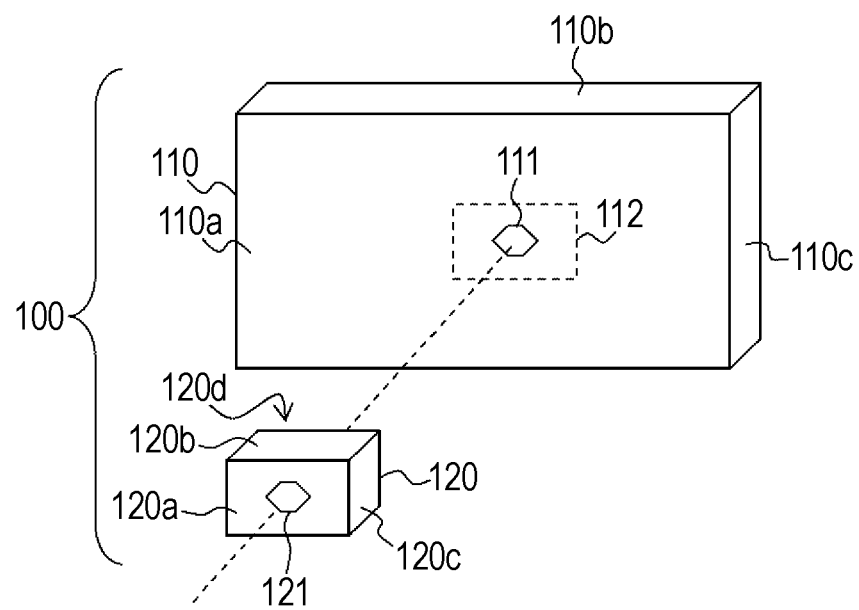
FIGS. 1A and 1B are diagrams illustrating an example of a three-dimensional model to be expressed.
Figure 1B:
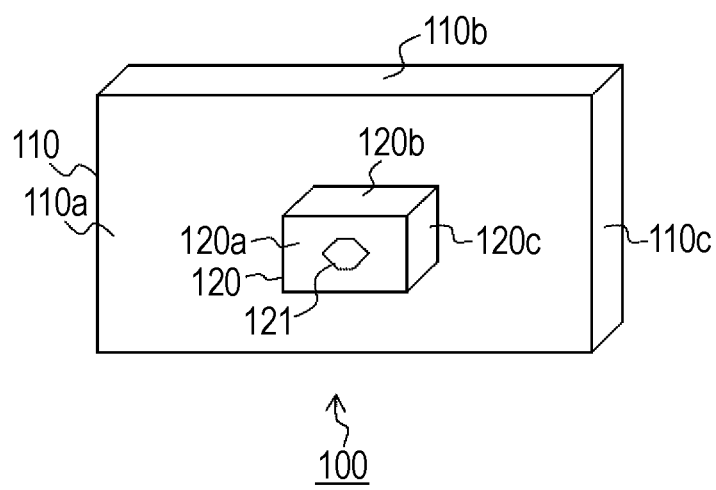

FIGS. 1A and 1B are diagrams illustrating an example of three-dimensional model to be expressed. In this embodiment, a three-dimensional model 100 to be expressed includes a component 110 and a component 120. That is, the components 110 and 120 are each an element composing the three-dimensional model 100. Here, FIG. 1A illustrates the state of the three-dimensional model 100 before it is assembled, and FIG. 1B illustrates the state of the three-dimensional model 100 wherein the component 120 has been attached to the component 110.

The component 110 is a rectangular solid, and includes six surface regions 110a to 110f. However, surface regions 110d to 110f are not depicted in FIGS. 1A and 1B. The surface region 110a of the component 110 has a hole 111 formed therein. The component 120 is a rectangular solid smaller than the component 110, and includes six surface regions 120a to 120f. However, surface regions 120d to 120f are not depicted in FIGS. 1A and 1B. The component 120 has a hole 121 formed therein. The hole 121 penetrates the component 120 from the surface region 120a to the surface region 120d. Here, the surface region 120d is the surface opposite to the surface region 120a, and makes contact with the surface region 110a of the component 110 when the three-dimensional model 100 is assembled. Although the holes 111 and 121 are each a circle in actuality, they are each represented approximately by a hexagon in the model according to the embodiment.

The three-dimensional model 100 is formed by attaching the component 120 to the component 110. A contact region 112 indicated by a broken line in FIG. 1A is a region with which the surface region 120d of the component 120 makes contact with the component 110 when the three-dimensional model is assembled. That is, when the three-dimensional model 100 is assembled, the component 120 is disposed on the contact region 112 on the component 110 and fixed using, for example, screws (not shown).

Figure 2:
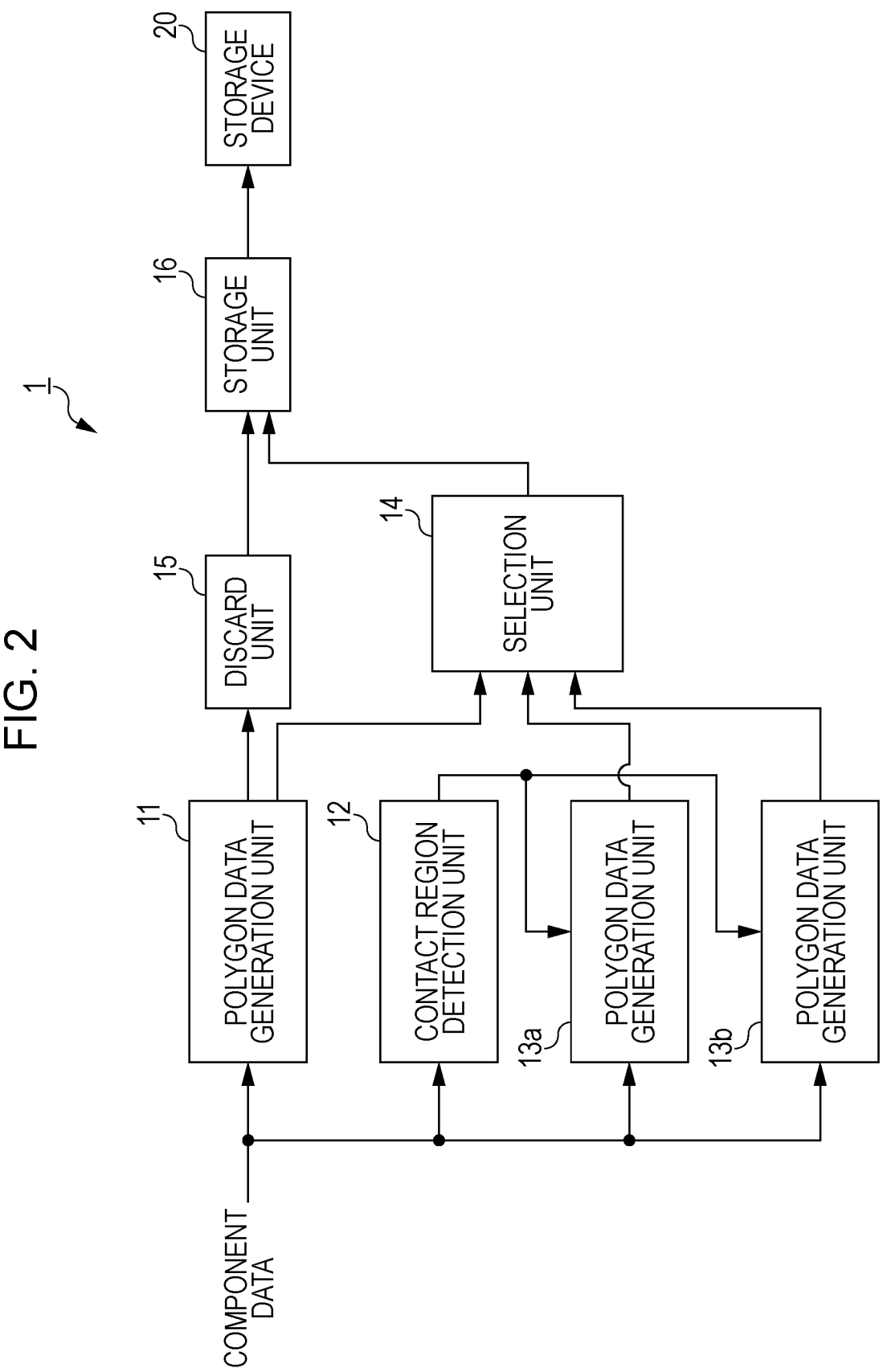
FIG. 2 is a diagram illustrating the configuration of a three-dimensional model data generation apparatus according to an embodiment of the present invention.

FIG. 2 is a diagram illustrating the configuration of the three-dimensional model data generation apparatus according to the embodiment. The three-dimensional model data generation apparatus 1 according to the embodiment includes a polygon data generation unit 11, a contact region detection unit 12, polygon data generation units 13a and 13b, a selection unit 14, a discard unit 15, and a storage unit 16. The three-dimensional model data generation apparatus 1 generates surface shape data based on given component data, and stores it in a storage device 20. The component data includes information on a shape and coordinates of each component, and may be generated by a user using CAD, for example. The storage device 20 is not particularly limited to a storage device; and may be, for example, a hard disk device or a semiconductor memory.

The polygon data generation unit 11 generates polygon data for each component. The method for generating polygon data from component data is not particularly restricted and known techniques may be utilized. When component data related to the three-dimensional model 100 illustrated in FIG. 1 is input, the polygon data generation unit 11 generates polygon data for each of the surface regions 110a to 110f and polygon data for each of the surface regions 120a to 120f.

Figure 3A:
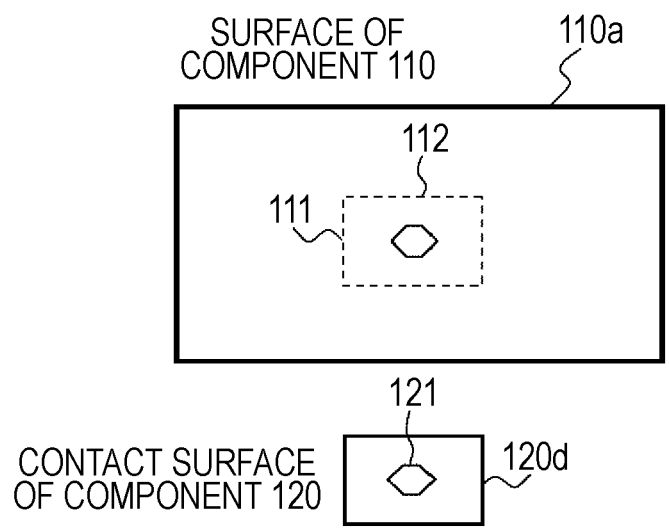
FIGS. 3A and 3B are diagrams illustrating an example of polygon data generation.
Figure 3B:
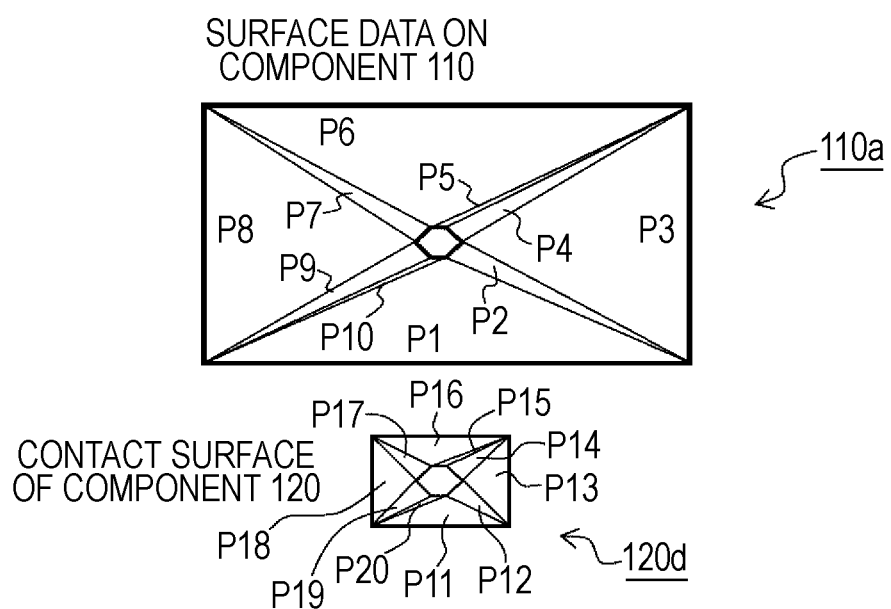

FIGS. 3A and 3B are diagrams illustrating an example of polygon data generation. Here, description is made of polygon data generated for the surface region 110a of the component 110 and the surface region 120d of the component 120. The surface regions 110a and 120d make contact with each other, as described above in FIG. 1.

FIG. 3A is a diagram illustrating the surface regions 110a and 120d. The surface region 110a is a rectangle and has a hexagonal hole 111 formed therein. The surface region 120d is a rectangle smaller than the surface region 110a, and has a hexagonal hole 121 formed therein. In FIG. 3A, the contact region 112 indicated by the broken line is a region with which the surface region 120d of the component 120 makes contact when the three-dimensional model 100 is assembled. In the surface region 110a, the region except the contact region 112 is exposed even in a state where the three-dimensional model 100 has been assembled. This region, therefore, may be referred to as an "exposed region".

FIG. 3B is a diagram illustrating polygons generated for the surface regions 110a and 120d. In this example, each of the polygons is a triangle. So, the surface region 110a is expressed by 10 polygons P1 to P10. Likewise, the surface region 120d is also expressed by 10 polygons P11 to P20.

The contact region detection unit 12 detects whether components are in contact with each other. If the components are in contact with each other, the contact region detection unit 12 also detects whether a surface region of one component includes a surface region of the other component. In the example illustrated in FIG. 1, the contact region detection unit 12 detects that the surface regions 110a and 120a are in contact with each other, and that the surface region 120d is included in the surface region 110a. The contact region may be detected either by utilizing component data input from the CAD system, or by utilizing polygon data generated by the polygon data generation unit 11. The method for detecting the contact region will be explained later in detail.

Figure 4A:
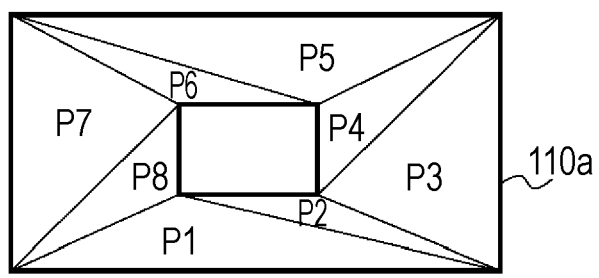
FIGS. 4A and 4B are diagrams illustrating an example of temporary polygon data.

When a contact region has been detected by the contact region detection unit 12, the polygon data generation unit 13a generates a first temporary polygon data based on the detected result and the component data. If a surface region (herein, referred to as "region X") of one component includes a surface region (herein, referred to "region Y") of the other component, the first temporary polygon data corresponds to polygon data on an exposed region in the region X. For example, in the example illustrated in FIG. 1, since the surface region 120d is included in the surface region 110a, the first temporary polygon data on the surface region 110a is generated. Regarding the surface region 110a, the first temporary polygon data represents 8 polygons P1 to P8 as illustrated in FIG. 4A.

Figure 4B:
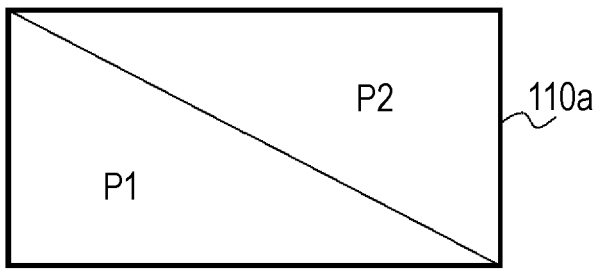

When a contact region has been detected by the contact region detection unit 12, the polygon data generation unit 13b generates a second temporary polygon data on the basis of the detected result and the component data. If the surface region of one component (herein, a region X) includes a surface region of the other component (herein, a region Y), the second temporary polygon data is generated regarding the region X. At this time, the polygon data generation unit 13b defines a virtual surface region having the same contour as that of the region X, and generates polygon data on the virtual surface region. For example, in the example illustrated in FIG. 1, a virtual surface region having the same contour as that of the surface region 110a is defined. In this virtual surface region, there exists no hole 111 illustrated in FIG. 1. Therefore, regarding the surface region 110a, the second temporary polygon data represents two polygons P1 to P2, as illustrated in FIG. 4B.

The selection unit 14 performs a comparison among polygon data generated by the polygon data generation unit 11, the first temporary polygon data generated by the polygon data generation unit 13a, and the second temporary polygon data generated by the polygon data generation unit 13b. The selection unit 14 selects the polygon data that has the minimum number of polygons from among the polygon data. In the example illustrated in FIG. 1, the comparison is performed for the surface region 110a. According to the comparison results, in the polygon data generated by the polygon data generation unit 11, the number of polygons is 10 as illustrated in FIG. 3B. Furthermore, the number of polygons in the first temporary polygon data is 8 as illustrated in FIG. 4A, and the number of polygons in the second temporary polygon data is 2 as illustrated in FIG. 4B. Therefore, in this case, the second temporary polygon data is selected by the selection unit 14.

When a contact region has been detected by the contact region detection unit 12, the discard unit 15 discards the surface shape data of one of a pair of surface regions that are contact with each other. In the example illustrated in FIG. 1, polygon data on the surface region 120d of the component 120 is discarded.

The storage unit 16 stores the polygon data generated by the polygon data generation unit 11 in the storage device 20. However, when a contact region has been detected between components, not all polygon data generated by the polygon data generation unit 11 is stored; a portion of the polygon data is discarded or replaced.

In the above-described example, the polygon data generation unit 11 generates polygon data on the surface regions 110a to 110f the component 110, and polygon data on the surface regions 120a to 120f of the component 120. Moreover, the contact region detection unit 12 detects that the surface regions 110a and 120d are in contact with each other. Thereupon, the discard unit 15 discards the polygon data on the surface region 120d illustrated in FIG. 3B. Furthermore, the selection unit 14 outputs the second temporary polygon data illustrated in FIG. 4B instead of the polygon data on the surface region 110a generated by the polygon data generation unit 11.

At this time, by discarding the polygon data on the surface region 120d, 10 polygons are eliminated. Moreover, by replacing the polygon data on the surface region 110a with the second temporary polygon data, 8 polygons are eliminated. That is, a total of 18 polygons are eliminated.

In this manner, according to the three-dimensional model data generation apparatus 1 in the embodiment, the amount of polygon data to be stored in the storage device 20 decreases. This allows reduction in capacity of the storage device 20.

In the above-described example, although the surface region 120d of the component 120 is included in the surface region 110a of the component 110 as illustrated in FIG. 1, the three-dimensional model data generation method according to the embodiment is not restricted to such a model. That is, as illustrated in FIG. 5A, also in the case wherein a portion of the surface region 110a of the component 110 and a portion of the surface region 130d of the component 130 make contact with each other, the number of polygons is reduced by the three-dimensional model data generation method according to the embodiment, as well. The surface region 130d, which is the surface opposite to the surface region 130a, makes contact with the surface region 110a of the component 110 when the three-dimensional model 100 is assembled. FIG. 5B illustrates polygon data on the surface regions 110a and 130d. Here, the number of polygons of the surface region 110a is 10, and the number of polygons of the surface region 130d is also 10.

Figure 6A:
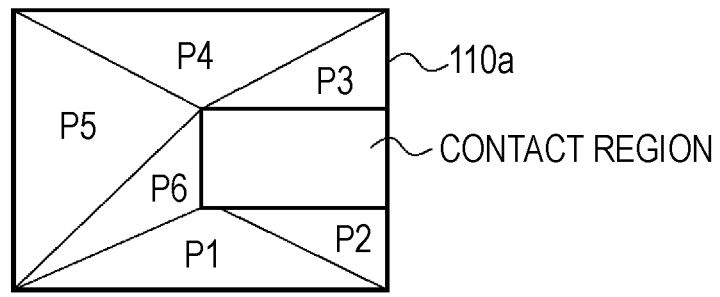
FIGS. 6A to 6C are diagrams illustrating an example of polygon data erasure regarding the model illustrated in FIG. 5.
Figure 6B:
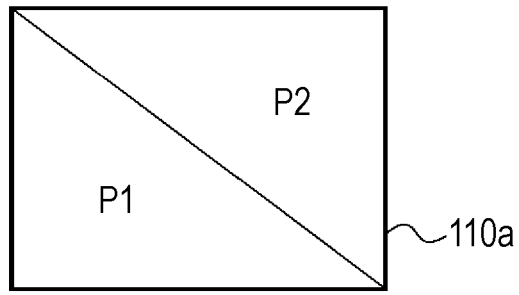

FIG. 6A illustrates the first temporary polygon data on the surface region 110a. In this case, 6 polygons P1 to P6 are generated. FIG. 6B illustrates the second temporary polygon data on the surface region 110a. In this case, 2 polygons P1 and P2 are generated. Accordingly, the polygon data on the surface region 110a is replaced with the second temporary polygon data (P1 and P2) illustrated in FIG. 6B.

Figure 6C:
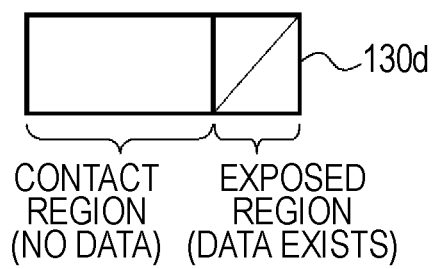

As illustrated in FIG. 6C, in the surface region 130d of the component 130, polygon data on the contact region is discarded by the discard unit 15. Regarding a region except the contact region in the surface region 130d, e.g., an exposed region, polygon data is generated. In this case, the number of polygons is 2.

Hereinafter, the three-dimensional model data generation method according to the embodiment will be described with reference to flowcharts.

FIG. 7 is a schematic flowchart of a three-dimensional model data generation method according to the embodiment. This flowchart may be executed, for example, when input CAD data is stored upon being converted into polygon data.

In step S1, component data on each component is input. In the example illustrated in FIG. 1, component data on the components 110 and 120 is input. The component data is, for example, polygon data. The polygon data includes information indicating the number of polygons and information indicating the positions of vertexes of each of the polygons. In steps S2 and S3, it is checked whether the same surface exists between components. That is, it is checked whether a surface region of a component is in contact with a surface region of the other component. If a same surface region (that is, a contact region) exists, it is checked, in step S4, whether or not one of the surface regions that are in contact with each other is included in the other surface region.

If the one surface region is included in the other surface region, corresponding polygon generation processing is executed in step S5. In the model illustrated in FIG. 1, step S5 is executed. On the other hand, if a portion of one surface region overlaps a portion of the other surface region, corresponding polygon generation processing is executed in step S6. In the model illustrated in FIG. 5, step S6 is executed.

Figure 8:
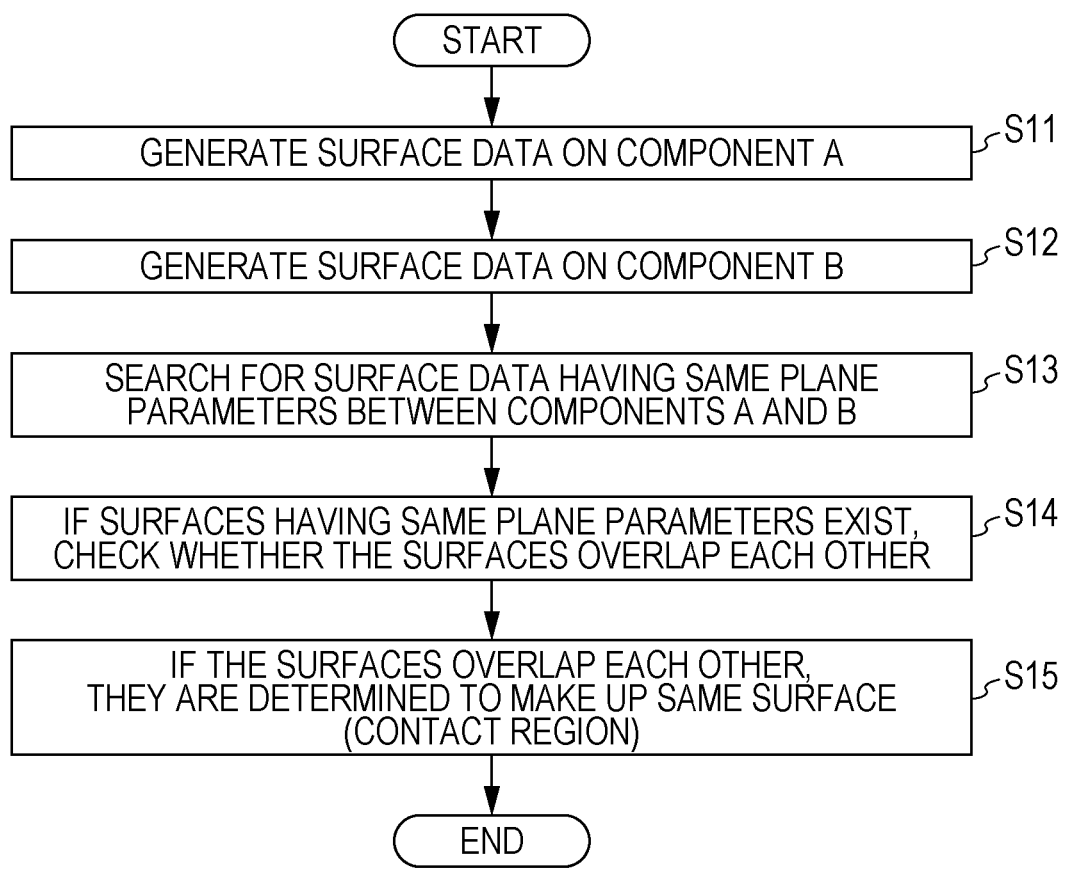
FIG. 8 is a flowchart of processing for checking whether there exists a contact surface on which components are in contact with each other.

FIG. 8 is a flowchart of processing for checking whether there exists a surface on which components are in contact with each other. This processing corresponds to step S2 illustrated in FIG. 7. Hereinbelow, determination as to whether or not there exists a surface on which components A and B are in contact with each other, shall be performed.

In step S11, surface data on the component A is generated. In step S12, surface data on the component B is generated. The surface data is defined by a plane parameter (positions of points on a plane and a normal vector of the plane), and information indicating positions of vertexes making up a contour line of the plane. In step S13, plane parameters regarding the component A and plane parameters regarding the component B are compared to search for a parameter mutually coincident between the components A and B.

If a mutually coincident plane parameter exists between the components A and B, it is checked, in step S14, whether the surfaces of the components A and B overlap each other or not. If the surfaces having the same plane parameter overlap each other, it is determined, in step S15, that these surfaces are in contact with each other.

Figure 9:
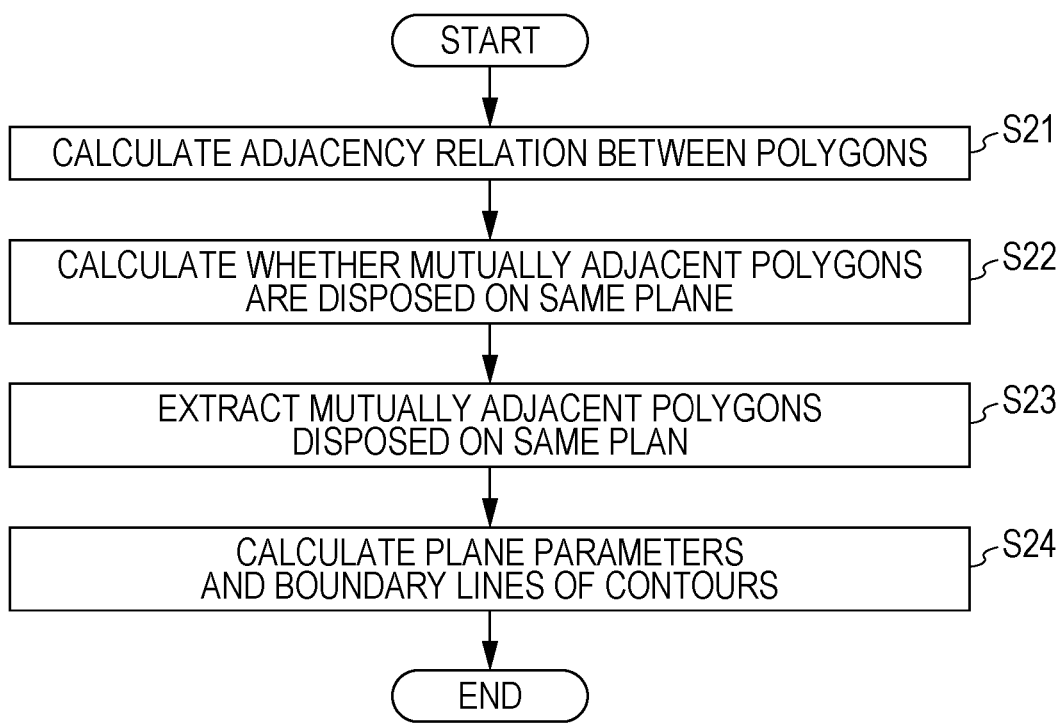
FIG. 9 is a flowchart of processing for generating surface data.

FIG. 9 is a flowchart of processing for generating surface data. This processing corresponds to step S11 or S12 illustrated in FIG. 8. Here, it is assumed that surface data is generated from polygon data.

In step S21, the adjacency relationship between polygons is calculated. As an example, polygons of which two sets of vertexes mutually coincide are determined to be mutually adjacent to each other. For example, in FIG. 10, a polygon P1 has vertexes "a" "b" and "f", and a polygon P2 has vertexes "b" "e" and "f". That is, between the polygons P1 and P2, the vertex "b" is common to each other, and also the vertex "f" is common to each other. In this case, therefore, it is determined that the polygons P1 and P2 are adjacent to each other. Likewise, it is determined that the polygon P2 and a polygon P3 are adjacent to each other, and that the polygon P3 and a polygon P4 are adjacent to each other.

In step S22, it is checked whether or not mutually adjacent polygons are disposed on the same plane. In step S23, polygons disposed on the same plane are extracted. In the example illustrated in FIG. 10, it is determined that the polygons P1 to P4 are disposed mutually adjacently on the same plane. In step S24, plan parameters are calculated, and boundary lines of contours are also calculated.

Figure 10:
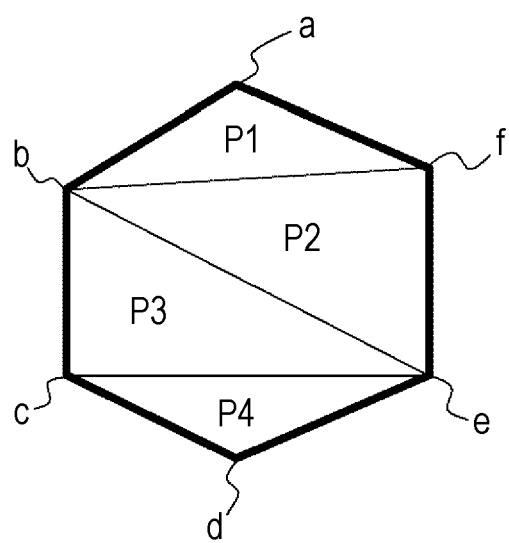
FIG. 10 is a diagram explaining processing for generating surface data.

The boundary line of a contour may be information indicating positions of vertexes (in FIG. 10, six vertexes "a" to "f").

Figure 11A:
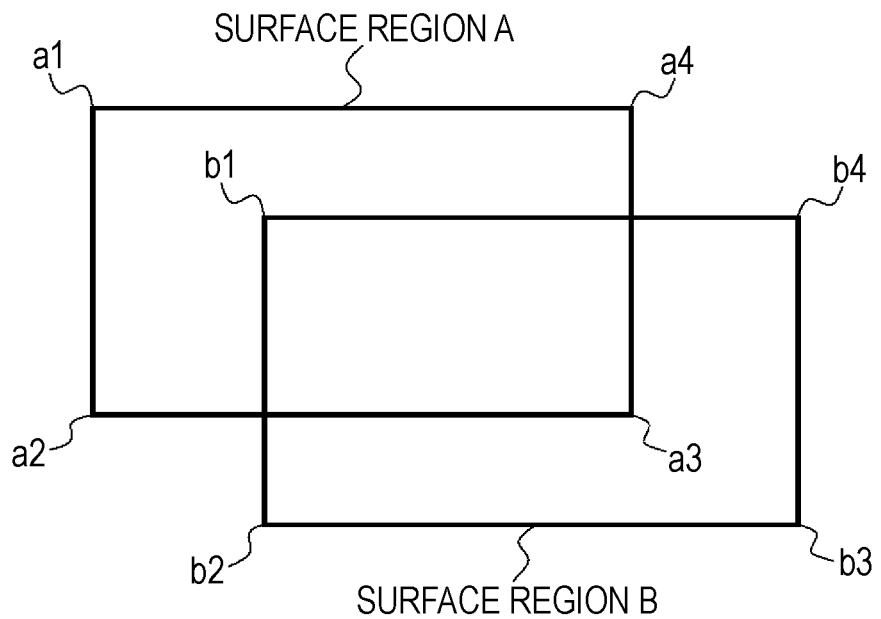
FIGS. 11A and 11B are diagrams explaining inclusive relationships between surface regions.
Figure 11B:
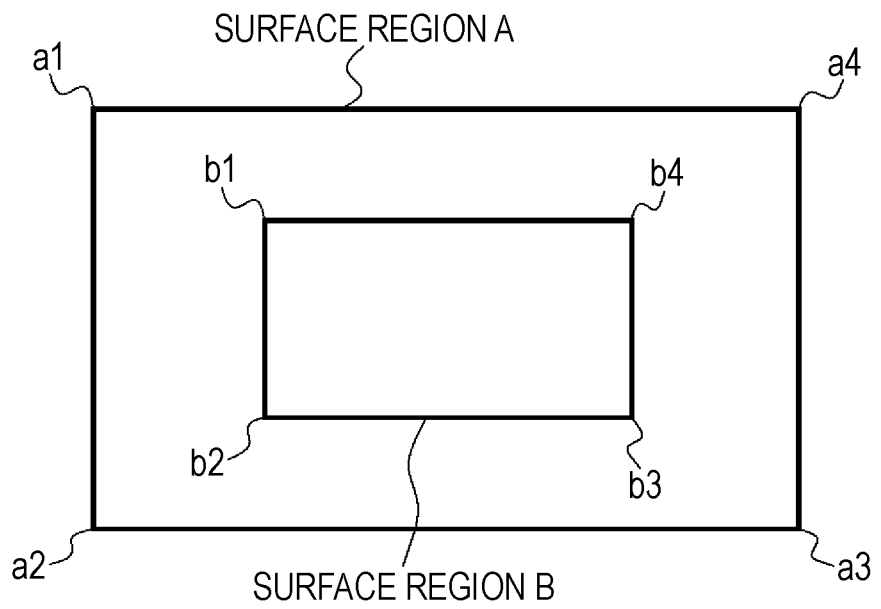

FIGS. 11A and 11B are diagrams explaining processing for detecting the overlap of surface regions. This processing corresponds to step S4 in FIG. 7. In the description hereinafter, it is assumed that the surface regions A and B are disposed on the same plane. Furthermore, it is assumed that the surface region A is represented by vertexes a1 to a4, and the surface region B is represented by vertexes b1 to b4.

If at least one of the following conditions is satisfied, the surface regions A and B are determined to be overlapped with each other: (1) inside the boundary line defining the contour of the surface region A, at least one of the vertexes defining the surface region B exists; (2) inside the boundary line defining the contour of the surface region B, at least one of the vertexes defining the surface region A exists. For example, the model illustrated in FIG. 11A satisfies both of the above-described conditions. On the other hand, the model illustrated in FIG. 11B satisfies only the above-described condition (1).

Furthermore, the determination of inclusive relationships follows the conditions described below: (1) inside the boundary line defining the contour of the surface region A, all of the vertexes defining the surface region B are located; (2) inside the boundary line defining the contour of the surface region B, all of the vertexes defining the surface region A are located; (3) inside the boundary line defining the contour of the surface region A, only some of the vertexes defining the surface region B are located; and (4) inside the boundary line defining the contour of the surface region B, only some of the vertexes defining the surface region B are located. For example, the model illustrated in FIG. 11B satisfies the above-described condition (1). That is, it is determined that the surface region B is included in the surface region A. On the other hand, the model illustrated in FIG. 11A satisfies the above-described condition (3) and (4). That is, it is determined that only a portion of the surface regions A and B are overlapped with each.

Figure 12:
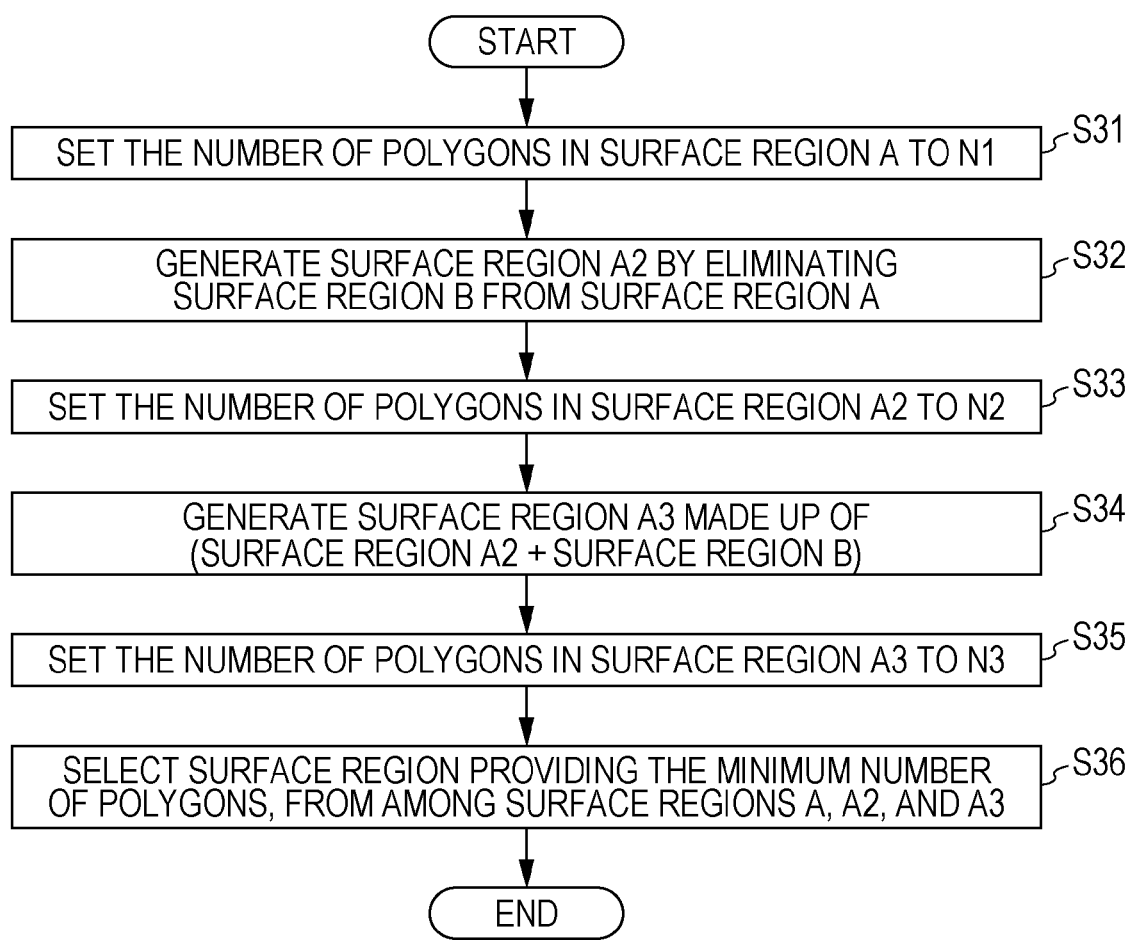
FIG. 12 is a flowchart illustrating polygon data generation in the case wherein one surface region is included in the other surface region.

FIG. 12 is a flowchart illustrating polygon data generation in the case where one surface region is included in the other surface region. This processing corresponds to step S5 in FIG. 7. In the following description, it is assumed that the surface region A includes the surface region B.

In step S31, polygon data is generated regarding the surface region A. Here, the number of generated polygons is set to N1. A corresponding example is the surface data illustrated in FIG. 3B, wherein "N1=10" is obtained.

In step S32, by eliminating the surface region B (i.e., the contact region) from the surface region A, a surface region A2 is generated. In step S33, polygon data is generated regarding the surface region A2. Here, the number of generated polygons is set to N2. A corresponding example is the surface data illustrated in FIG. 4A, wherein "N2=8" is obtained.

In step S34, a surface region A3, which has the same contour as that of the surface region A, and of which the inside region, is generated free of defects. The term "defect" set forth herein means a discontinuous region, and may be, for example, a hole existing inside a surface. In step S35, polygon data on the surface region A3 is generated. Here, the number of generated polygons is set to N3. A corresponding example is the surface data illustrated in FIG. 4B, wherein "N3=2" has been obtained.

In step S36, the polygon numbers N1 to N3 are compared to each other, to select a surface region providing the minimum number of polygons. In the above-described example, since "N1=10", "N2=8", and "N3=2", the surface region A3 is selected. Then, the polygon data generated regarding the selected surface region is output. As to the surface region B, no polygon data is generated, as described above by reference to FIGS. 1 to 4 (alternatively, polygon data is discarded).

Figure 13:
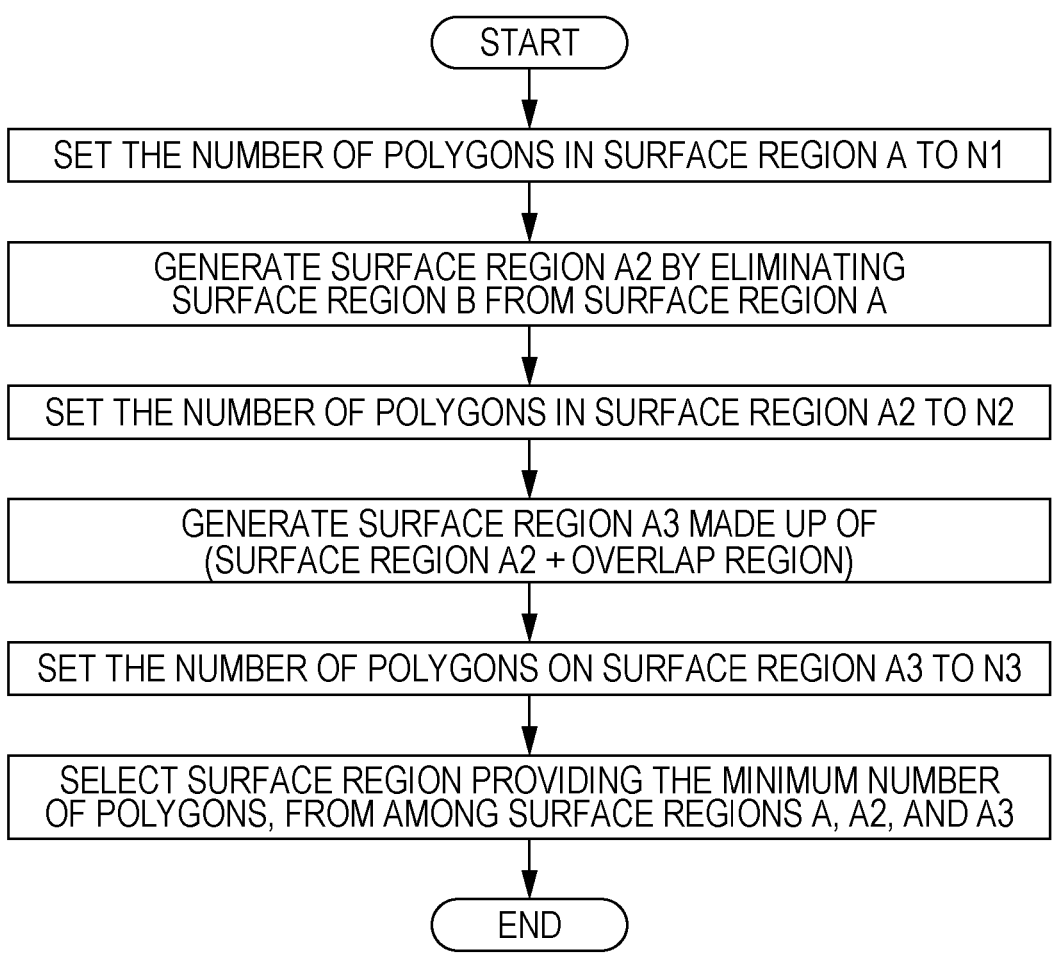
FIG. 13 is a flowchart illustrating polygon data generation in the case wherein, out of two surface regions, only a portion of one surface region overlaps only a portion of the other surface region.

FIG. 13 is a flowchart illustrating polygon data generation in the case wherein, out of two surface regions, only a portion of one surface region overlaps a portion of another surface region. This processing corresponds to step S6 in FIG. 7. The procedure of the flowchart illustrated in FIG. 13 is basically the same as the procedure of the flowchart illustrated in FIG. 12. However, the surface region A2 is generated by eliminating the overlapping region between the surface regions A and B, from the surface region A. The processing of the flowchart illustrated in FIG. 13 may be executed with respect to both of the surface regions A and B.

Meanwhile, the procedure introduced into the above-described embodiment is such that, after polygon data on all surface regions has once been generated, polygon data on one of two surface regions that are in contact with each other is discarded. However, the present invention is not limited to this arrangement and method. For example, the polygon data on one surface region of a contact region is not necessarily required to be generated from the beginning.

[Hardware Configuration]

Figure 14:
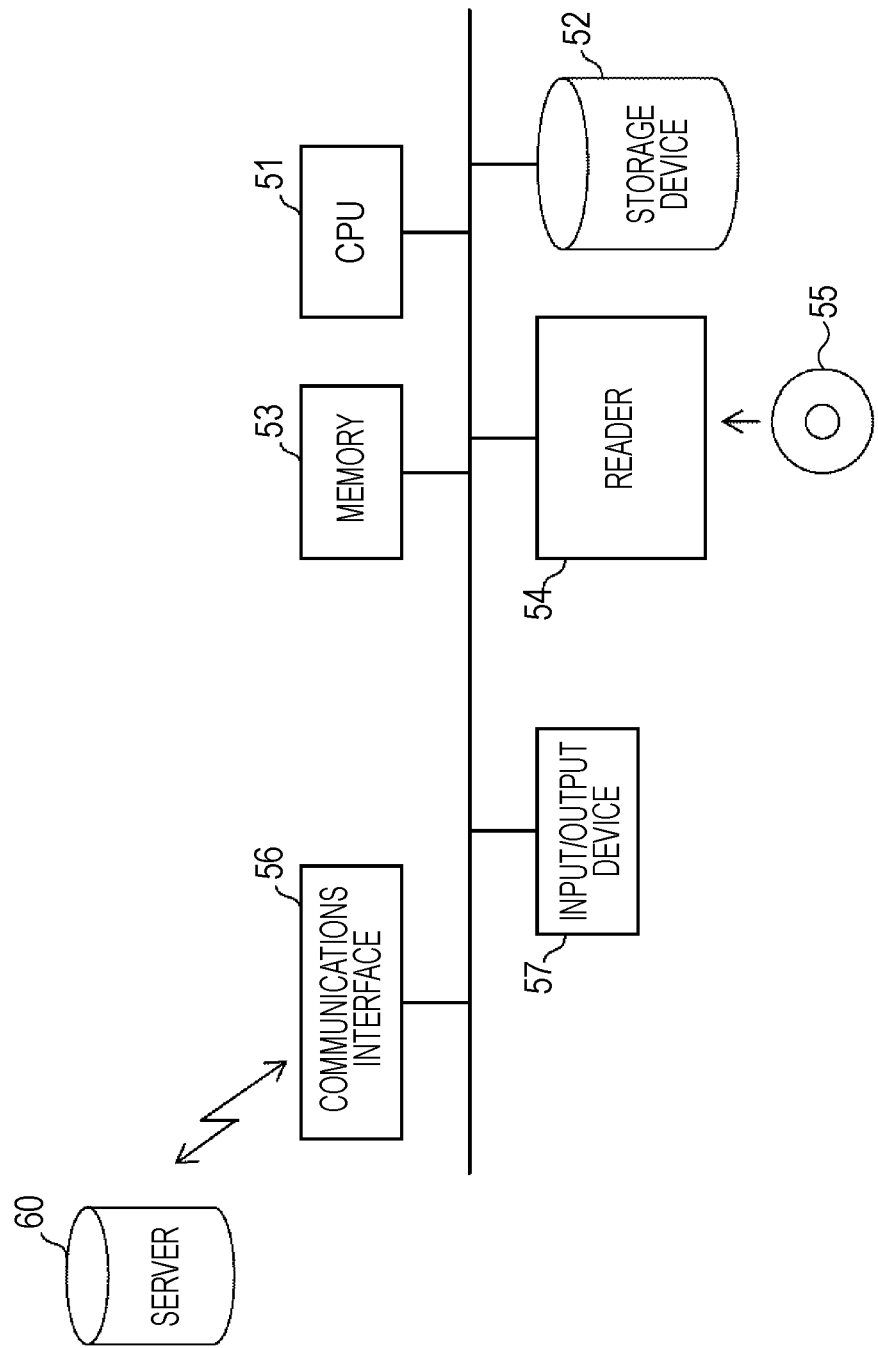
FIG. 14 is a diagram illustrating the configuration of hardware associated with the three-dimensional model data generation apparatus according to the embodiment.

FIG. 14 is a diagram illustrating the configuration of hardware associated with the three-dimensional model data generation apparatus 1 according to the embodiment. In FIG. 14, a CPU 51 executes a three-dimensional model data generation program utilizing a memory 53. A storage device 52 may be, for example, a hard disk, and stores the three-dimensional model data generation program. The storage device 52 may also be a recording device connected to a computer. The memory 53 may be, for example, a semiconductor memory, and includes a RAM region and a ROM region.

A reader 54 accesses a portable recording medium 55 under instructions of the CPU 51. The portable recording medium 55 includes, for example, a semiconductor device (PC card or the like), a medium to or from which information is input and output by a magnetic function, and a medium to or from which information is input and output by an optical function. A communications interface 56 transmits and receives, under instructions of the CPU 51, data via a network. An input/output device 57, in this embodiment, may correspond to, for example, a device receiving instructions from a display device and a user.

The three-dimensional model data generation program according to the embodiment may be provided, for example, in the following modes: (1) installed in advance on the storage device 52; (2) provided by the portable recording medium 55; (3) downloaded from a program server 60. Thus, by executing the three-dimensional model data generation program with the above-described configurations, the three-dimensional model data generation apparatus 1 according to the embodiment is implemented.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in

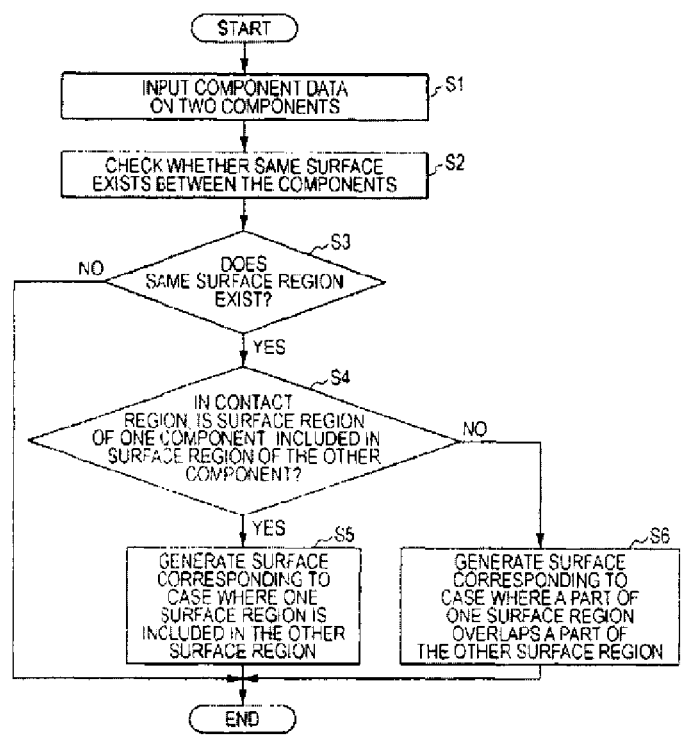

What is claimed is:

1. A three-dimensional model data generation apparatus for generating and storing a three-dimensional model expressing a three-dimensional object that includes a first element having a first surface region and a second element having a second surface region, the apparatus comprising:
   a detection unit detecting a contact region on which the first surface region and the second surface region are in contact with each other;
   a generation unit generating surface shape data on the first and second elements and including a first polygon generation unit, which generates polygon data on the first surface region, and a second polygon generation unit, which generates polygon data on the exposed region except the contact region in the first surface region;
   a storage unit storing, in a storage device, the surface shape data generated by the generation unit; and
   a discard unit discarding the surface shape data on the contact region in the second surface region,
   wherein the generation unit includes a third polygon generation unit defining a virtual surface region having the same contour as that of the first surface region, and generating polygon data on the virtual surface region.

2. The three-dimensional model data generation apparatus according to claim 1, wherein the surface shape data on the first element is polygon data.

3. The three-dimensional model data generation apparatus according to claim 1, wherein the generation unit generates surface shape data on an exposed region except the contact region in the first surface region, as surface shape data on the first surface region.

4. The three-dimensional model data generation apparatus according to claim 1, further comprising:
   a definition unit defining a virtual surface region having the same contour as that of the first surface region, and
   wherein the generation unit generates surface shape data on the virtual surface region as the surface shape data on the first surface region.

5. The three-dimensional model data generation apparatus according to claim 1, wherein the generation unit comprises:
   a selection unit selecting polygon data that has the minimum number of polygons, out of polygon data generated by the first to third polygon generation units,
   wherein the storage unit stores, in the storage device, the polygon data generated by the selection unit as surface shape data on the first surface region.

6. A three-dimensional model data generation apparatus for generating and storing a three-dimensional model expressing a three-dimensional object that includes a first element having a first surface region and a second element having a second surface region, the apparatus comprising:
   a detection unit detecting a contact region on which the first surface region and the second surface region are in contact with each other;
   a generation unit generating surface shape data on the first and second elements and including a first polygon generation unit, which generates polygon data on the first surface region, and a second polygon generation unit, which generates polygon data on the exposed region except the contact region in the first surface region;
   and a storage unit storing the surface shape data generated by the generation unit, in a storage device,
   wherein the generation unit generates no surface shape data on the contact region in the second surface region,
   wherein the generation unit includes a third polygon generation unit defining a virtual surface region having the same contour as that of the first surface region, and generating polygon data on the virtual surface region.

7. A three-dimensional model data generation method for generating and storing a three-dimensional model expressing a three-dimensional object that includes a first element having a first surface region and a second element having a second surface region, the method comprising:
   detecting a contact region on which the first surface region and the second surface region are in contact with each other;
   generating surface shape data on the first and second elements;
   generating polygon data on the first surface region;
   generating polygon data on the exposed region except the contact region in the first surface region;
   storing the generated surface shape data in a storage device; and
   discarding surface shape data on the contact region in the second surface region,
   wherein processing for generating the surface shape data comprises:
   defining a virtual surface region having the same contour as that of the first surface region, and
   generating polygon data on the virtual surface region.

8. The three-dimensional model data generation method according to claim 7, wherein the surface shape data on the first element is polygon data.

9. The three-dimensional model data generation method according to claim 7, wherein the processing for generating surface shape data generates surface shape data on an exposed region except the contact region in the first surface region, as surface shape data on the first surface region.

10. The three-dimensional model data generation method according to claim 7, further comprising:
    defining a virtual surface region having the same contour as that of the first surface region,
    wherein the processing for generating surface shape data generates surface shape data on the virtual surface region as surface shape data on the first surface region.

11. The three-dimensional model data generation method according to claim 7, wherein the processing for generating surface shape data further comprises:
    selecting polygon data that has the minimum number of polygons, out of polygon data generated by the first to third polygon generation units, wherein the processing for storing the generated polygon data in the storage device stores, in the storage device, the polygon data selected by the selection unit as surface shape data on the first surface region.

12. A non-transitory recording medium with a program recorded therein for causing a computer to execute a three-dimensional model data generation method for generating and storing three-dimensional model data expressing a three-dimensional object that includes a first element having a first surface region and a second element having a second surface region, the method comprising:
    detecting a contact region on which the first surface region and the second surface region are in contact with each other;
    generating surface shape data on the first and second elements;
    generating polygon data on the first surface region;
    generating polygon data on the exposed region except the contact region in the first surface region;

storing the generated surface shape data in a storage device; and discarding the surface shape data on the contact region in the second surface region, wherein the processing for generating surface shape data comprises:

generating polygon data on the first surface region;

generating polygon data on the exposed region except the contact region in the first surface region;

defining a virtual surface region having the same contour as that of the first surface region, and generating polygon data on the virtual surface region.

13. The non-transitory recording medium according to claim 12, wherein the surface shape data on the first element is polygon data.

14. The non-transitory recording medium according to claim 12, wherein the processing for generating surface shape data generates surface shape data on an exposed region except the contact region in the first surface region, as surface shape data on the first surface region.

15. The non-transitory recording medium according to claim 12, further comprising:

defining a virtual surface region having the same contour as that of the first surface region, wherein the processing for generating surface shape data generates surface shape data on the virtual surface region, as surface shape data on the first surface region.

16. The non-transitory recording medium according to claim 12, wherein the processing for generating surface shape data further comprises:

selecting polygon data that has the minimum number of polygons, out of polygon data generated by the first to third polygon generation units, wherein the processing for storing the generated polygon data in the storage device stores, in the storage device, the polygon data selected by the selection unit as surface shape data on the first surface region.

* * * * *

UNITED STATES PATENT AND TRADEMARK OFFICE
CERTIFICATE OF CORRECTION

| | | |
|---|---|---|
| PATENT NO. | : 8,514,223 B2 | Page 1 of 2 |
| APPLICATION NO. | : 12/505516 | |
| DATED | : August 20, 2013 | |
| INVENTOR(S) | : Masayoshi Hashima | |

It is certified that error appears in the above-identified patent and that said Letters Patent is hereby corrected as shown below:

The title page showing an illustrative Figure, should be deleted and substitute therefor the attached title page.

In the Drawings

In FIG. 7, at reference numeral S4, the second "is" should be removed from the step,
"IN CONTACT REGION, IS SURFACE REGION OF ONE COMPONENT [[IS]] INCLUDED IN SURFACE REGION OF THE OTHER COMPONENT?" as shown below.

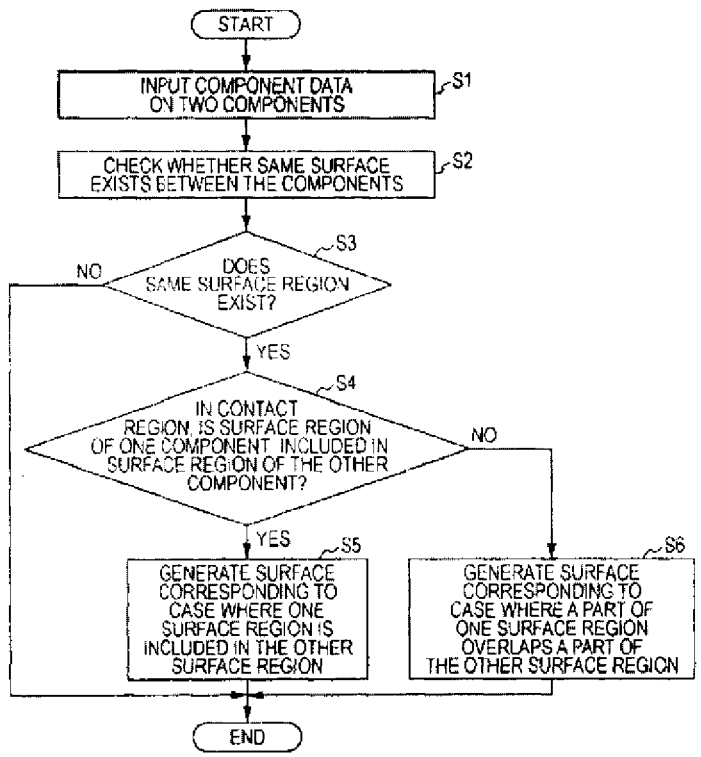

Signed and Sealed this
Twentieth Day of May, 2014

Michelle K. Lee
*Deputy Director of the United States Patent and Trademark Office*

(12) United States Patent
Hashima

(10) Patent No.: US 8,514,223 B2
(45) Date of Patent: Aug. 20, 2013

(54) APPARATUS AND METHOD FOR GENERATING THREE-DIMENSIONAL MODEL DATA

(75) Inventor: Masayoshi Hashima, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 946 days.

(21) Appl. No.: 12/505,516

(22) Filed: Jul. 19, 2009

(65) Prior Publication Data
US 2010/0020076 A1 Jan. 28, 2010

(30) Foreign Application Priority Data
Jul. 22, 2008 (JP) ................................ 2008-188656

(51) Int. Cl.
*G06T 17/00* (2006.01)
*G06T 17/20* (2006.01)
*G06T 15/30* (2011.01)

(52) U.S. Cl.
USPC .................................... 345/420; 345/423

(58) Field of Classification Search
USPC ................................................ 345/420, 423
See application file for complete search history.

(56) References Cited

U.S. PATENT DOCUMENTS
2008/0165188 A1* 7/2008 Uraki ............................ 345/420

FOREIGN PATENT DOCUMENTS
JP 2-59867 A 2/1990
JP 10-111885 A 4/1998

* cited by examiner

*Primary Examiner* — Xiao M. Wu
*Assistant Examiner* — Scott E Sonners
(74) *Attorney, Agent, or Firm* — Fujitsu Patent Center

(57) ABSTRACT

A three-dimensional model data generation apparatus generates and stores a three-dimensional model expressing a three-dimensional object that includes a first element having a first surface region and a second element having a second surface region. The apparatus includes a generation unit generating surface shape data on the first and second elements; a detection unit detecting a contact region on which the first surface region and the second surface region are in contact with each other; a storage unit storing, in a storage device, the surface shape data generated by the generation unit; and a discard unit discarding the surface shape data on the contact region in the second surface region.

16 Claims, 14 Drawing Sheets